No. 695,406. Patented Mar. 11, 1902.
R. LYNN.
TROLLEY SUPPORT.
(Application filed Aug. 27, 1901.)
(No Model.)
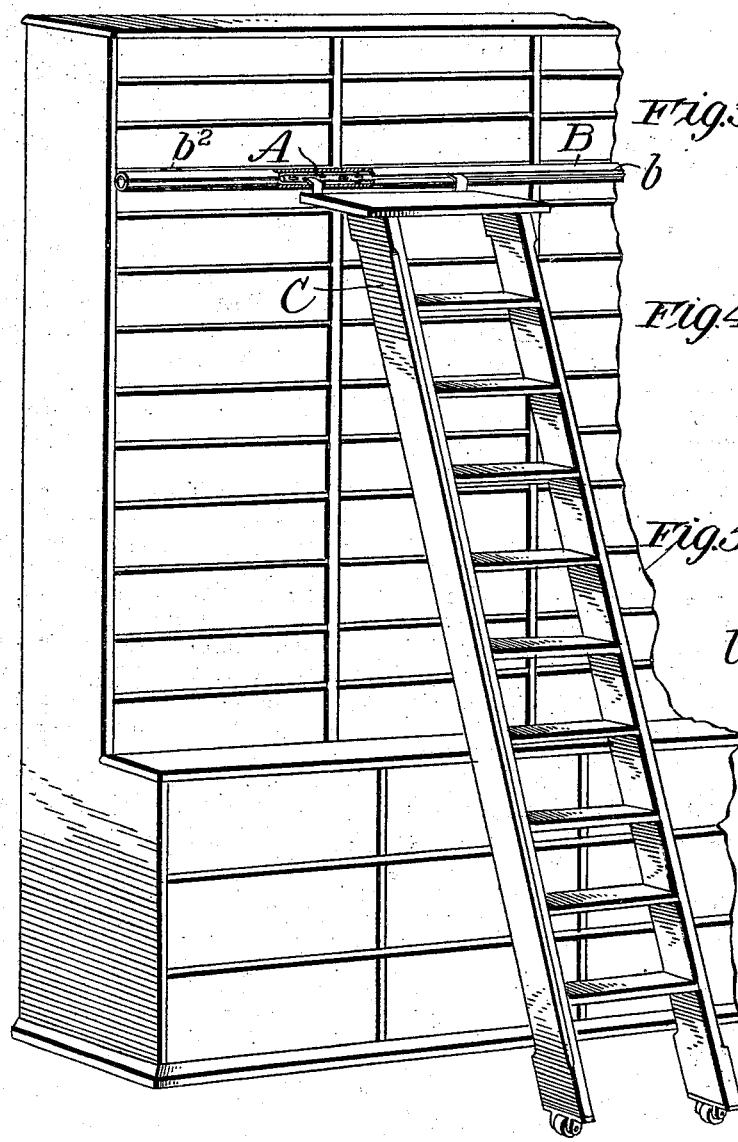
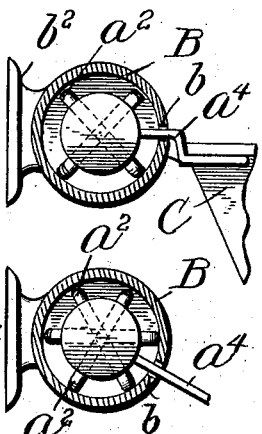
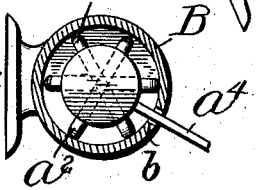
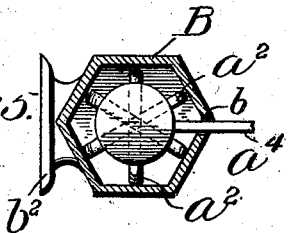
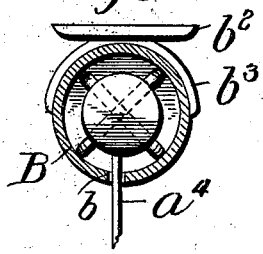
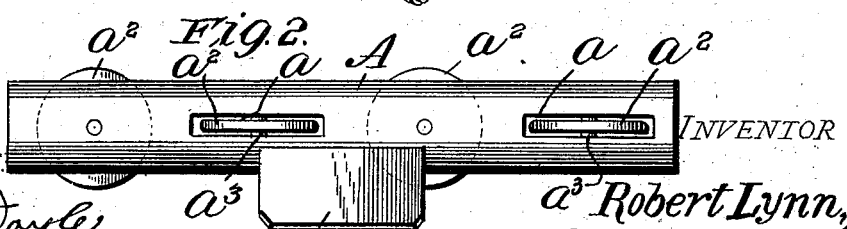
WITNESSES.
Wm. F. Doyle.
Geo. T. Brandenburg.
INVENTOR
Robert Lynn,
by his attorney
THE NORRIS PETERS CO., PHOTO-LITHO., WASHINGTON, D. C.

UNITED STATES PATENT OFFICE.

ROBERT LYNN, OF HOLYOKE, MASSACHUSETTS.

TROLLEY-SUPPORT.

SPECIFICATION forming part of Letters Patent No. 695,406, dated March 11, 1902.

Application filed August 27, 1901. Serial No. 73,507. (No model.)

*To all whom it may concern:*

Be it known that I, ROBERT LYNN, a citizen of the United States, residing at Holyoke, in the county of Hampden and State of Massachusetts, have invented certain new and useful Improvements in Trolley-Supports; and I do hereby declare the following to be a full, clear, and exact description of the invention, such as will enable others skilled in the art to which it appertains to make and use the same.

This invention relates to improvements in trolley-supports for step-ladders, carrier apparatus, conveyers, suspension-railways, &c.

The object is to present a roller-support or truck to operate within an inclosing track or way and be at all times properly stayed therein against pressure in various directions, so that the casing may be placed in any suitable position to enable the support to act as a hanger, as a laterally-movable guide, or as a movable support or suspension.

With this object in view the invention consists in a truck provided with rollers or wheels arranged at angles to each other to engage an inclosing or surrounding track or way, suitable means being provided to connect therewith the object to be braced, supported, carried, or guided by the truck.

The invention consists, further, in a truck or carrier provided with rollers or wheels arranged in sets, each set being mounted and working in a plane at right angles to the other to engage a surrounding track or way formed of a split tube, the truck being provided with a hanger to project through the slot for the purpose of supporting, bracing, carrying, or guiding the object to be moved in a given direction.

The invention consists, finally, in the novel construction and arrangement of parts of a trolley-support hereinafter described and claimed.

My invention is illustrated in the accompanying drawings, in which like reference-letters indicate corresponding parts throughout all the figures, and in these drawings—

Figure 1 is a view in perspective showing a movable step-ladder for stores, libraries, &c., equipped with my improvements. Fig. 2 is a view in elevation showing the truck or carriage of the device enlarged and separated from the track or support in which it is adapted to operate. Fig. 3 is an end view in section of the track secured to a side wall or support and showing the truck within in its operative position. Fig. 4 is a similar view showing the slot or split in the track arranged in the lower portion of the tubular track and also illustrating a modification of the truck. Fig. 5 is a similar view showing a modification of the track, and Fig. 6 is a similar view showing the tubular track suspended from or attached to an overhead support and having the split or slot in the tube arranged on its under side.

Referring to the drawings the truck or carriage portion of the device consists of a body portion A, in which are arranged the slots $a$, these, as shown in Fig. 2, being arranged in sets lying in intersecting planes. Mounted within these slots and projecting on opposite sides of the body portion are friction rollers or wheels $a^2$, having spindles $a^3$ entering and secured to the body portion. The wheels, as shown in this figure, are arranged alternately in the different planes, so as to be adapted to bear upon the inner surface of an inclosing track or way, as shown in Fig. 1. This inclosing track is preferably formed of a tube B, having a longitudinal slot or split $b$ running its entire length and adapted to be secured to a support by the brackets $b^2$. As shown in Figs. 1, 3, 4, and 5, this bracket is arranged to be secured to a vertical wall or support, the slot or split in the tube being arranged on the side. When the truck is placed within the tube or track, the hanger $a^4$, secured thereto, projects through the slot and is adapted to form a connection between the truck and the object to be supported, braced, carried, or guided by the truck—in this instance a movable step-ladder C. The internal diameter of the tubular track is slightly greater than the diameter of the truck-wheels, so that each wheel at any given time bears against the tube in one place only, and as they project upon either side of the truck and in different directions it will be seen that the body portion of the truck is at all times held from contact with the tube and is adapted to take the pressure or weight in any direction, such as downward, sidewise, or upward of the apparatus to be supported or guided in the direction of the track.

In Fig. 2 I have shown two sets of rollers or wheels mounted upon the track in planes intersecting at right angles; but I do not limit myself to this precise construction, as there may be a greater number of sets, each set arranged in a plane intersected by the plane of the others.

In Fig. 4 I have shown an end view, in which are employed three such sets, each in a plane intersecting the others at an angle of about sixty degrees. Of course the truck itself may be of any preferred length, so that the number of wheels mounted thereon may be increased or diminished at pleasure.

In Fig. 4 I have shown also the slot or split in the tubular track arranged below the horizontal, so that the hanger will project outward in a slightly downward direction to make connection with the apparatus adapted to coöperate with the truck.

Instead of having the track tubular in form it is to be understood that it may be in various other forms and still operate efficiently in connection with my truck.

In Fig. 5, in which the truck is shown equipped with three sets of wheels, similar to the construction shown in Fig. 4, I have shown the track formed hectagonal in cross-section, the slot or split being at the angle of intersection of two of the faces and the wheels of the truck being adapted to engage the faces of the hectagon, according to the direction of the pressure or pull upon the hanger $a^4$.

While I have shown also my invention as applied to a movable step-ladder for libraries, stores, warehouses, and the like, I wish it to be understood that this application is merely illustrative, as one of many of which my invention is capable. For instance, it may be applied to carrier apparatus for stores, warehouses, &c., in which case the track will usually be supported from above. It is also applicable to overhead or suspension railways, either for the carrying of freight or passengers, the size and details of construction of the device being varied to suit conditions or requirements in each individual case.

In Fig. 6 I have shown the tubular track thus supported from above and having the slot or split in the tube arranged on the under side, so that the hanger $a^4$, secured to the truck, projects in a downward direction to act as a support for the carriage or conveyer of the apparatus, as the case may be. In this figure also where pressure of the wheels bears upon the inner surface upon opposite sides of the slot I have shown braces $b^3$, extending from the supporting-track $b^2$, partly around the tube to strengthen the same and resist the tendency of the truck to open or widen the split. Of course the tube may be braced or reinforced in any other suitable manner.

In some instances it may be desirable to mount the tubular track with the slot or split on its upper side; but as I have illustrated the tube having the slot placed in various positions further illustration is deemed unnecessary.

Although I have described specifically the foregoing applications of my invention and a particular form or forms of embodiment thereof, I do not wish to be understood as limiting myself or the scope of the invention thereto, as various other embodiments may be devised without departing from the spirit of the invention, and these, I wish it to be understood, fall strictly within the scope and purview thereof.

Having thus fully described my invention, what I claim as new, and desire to secure by Letters Patent of the United States, is—

1. In a device of the character described, the combination with a truck, of wheels mounted thereon in intersecting planes and their respective axes intersecting a common line substantially as described.

2. In a device of the character described, the combination with a truck, of sets of wheels, each set being mounted upon the truck in a plane intersecting the plane of another set and their respective axes intersecting a common line substantially as described.

3. In a device of the character described, the combination with a truck, of wheels mounted thereon in planes intersecting at right angles and their respective axes intersecting a common line substantially as described.

4. In a device of the character specified, the combination with a movable truck carrying wheels mounted in intersecting planes, of a tubular casing inclosing said truck and adapted to serve as a track for the wheels, substantially as described.

5. In a device of the character described, the combination with a truck provided with wheels mounted in intersecting planes of a track inclosing said truck and having surfaces for the engagement of said wheels, substantially as described.

6. In a device of the character described, a truck provided with wheels mounted in intersecting planes, of a tubular track therefor surrounding said truck, the inner diameter of said tubular track being greater than the diameter of said wheels, substantially as described.

7. In a device of the character described, the combination of a truck provided with wheels mounted in intersecting planes, and a hanger secured to said truck, of a tubular track, the inner diameter of which is greater than the diameter of said wheels, said tube being provided with a longitudinal slot or split to permit the projection of said hanger, substantially as described.

8. In a device of the character described, the combination with a truck provided with wheels mounted in intersecting planes and projecting on opposite sides from the body of said truck, of a tubular track having an internal diameter greater than the diameter of said wheels and provided with a longitudinal slot, and a hanger secured to the truck and projecting through said slot, substantially as described.

9. In a device of the character described, the combination with a truck comprising a body portion, wheels mounted in intersecting planes upon said body portion and extending therethrough of a track inclosing said truck and having surfaces to be engaged by said wheels, substantially as described.

10. In a device of the character described, the combination with a track having a cylindrical body portion, slots arranged in said body portion and lying in intersecting planes, wheels mounted on the truck within said slots and projecting upon opposite sides of the body portion, of a slotted tubular inclosing track for said truck, the internal diameter of said track being greater than the diameter of said wheels, said track being provided with a longitudinal slot, and said truck having a hanger projecting through said slot, substantially as described.

In testimony whereof I affix my signature in the presence of two subscribing witnesses.

ROBERT LYNN.

Witnesses:
R. G. DYRENFORTH,
CHAS. E. RIORDON.